Figure 5:
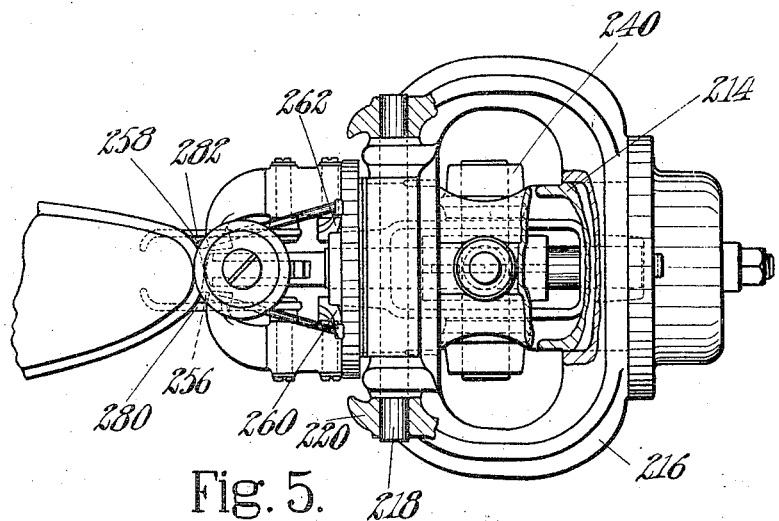

F. B. KEALL, J. GOULDBOURN & A. E. JERRAM.
MACHINE FOR OPERATING ON SHOES.
APPLICATION FILED JULY 3, 1909.
1,078,684.
Patented Nov. 18, 1913.
7 SHEETS—SHEET 1.
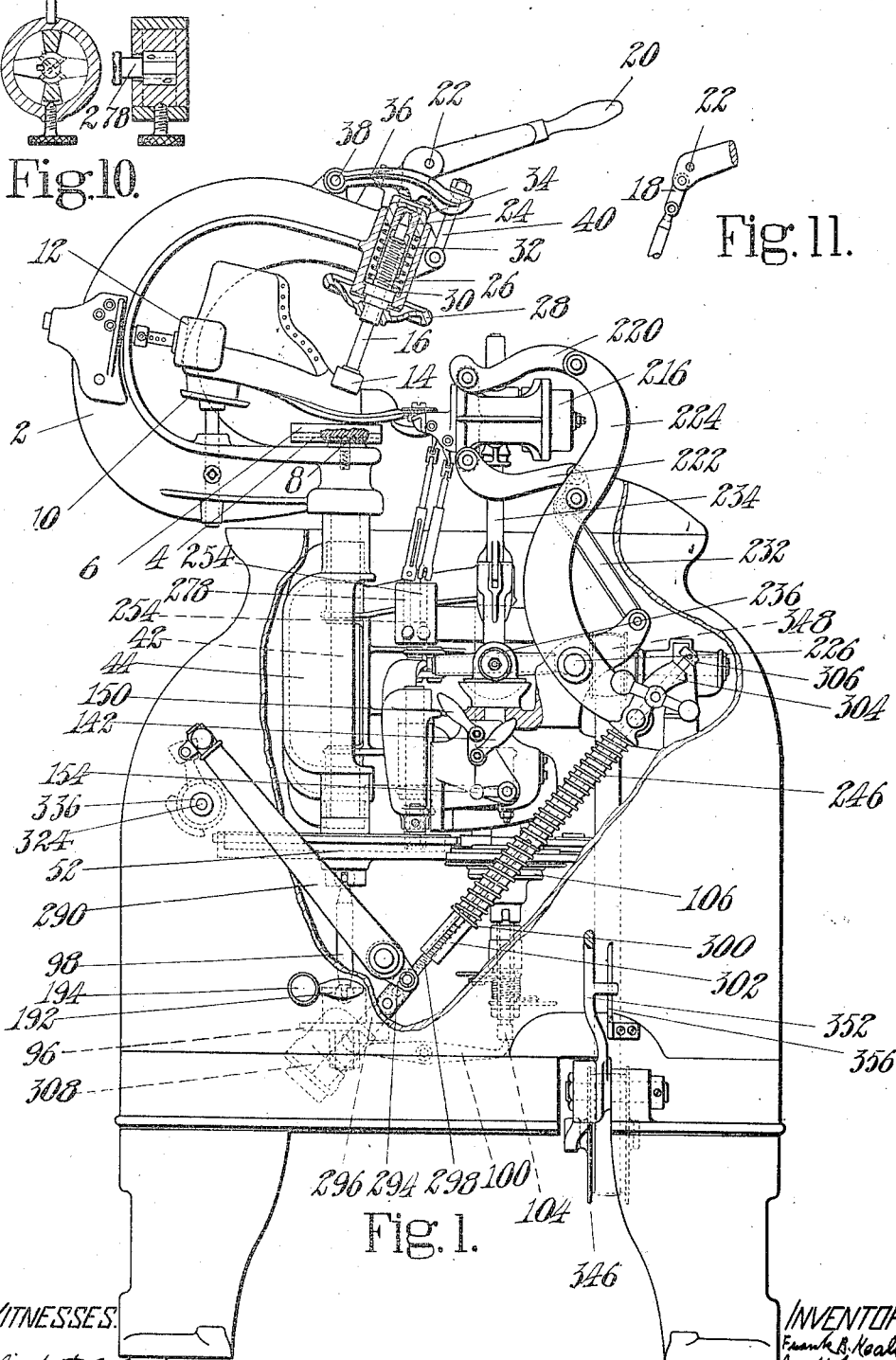

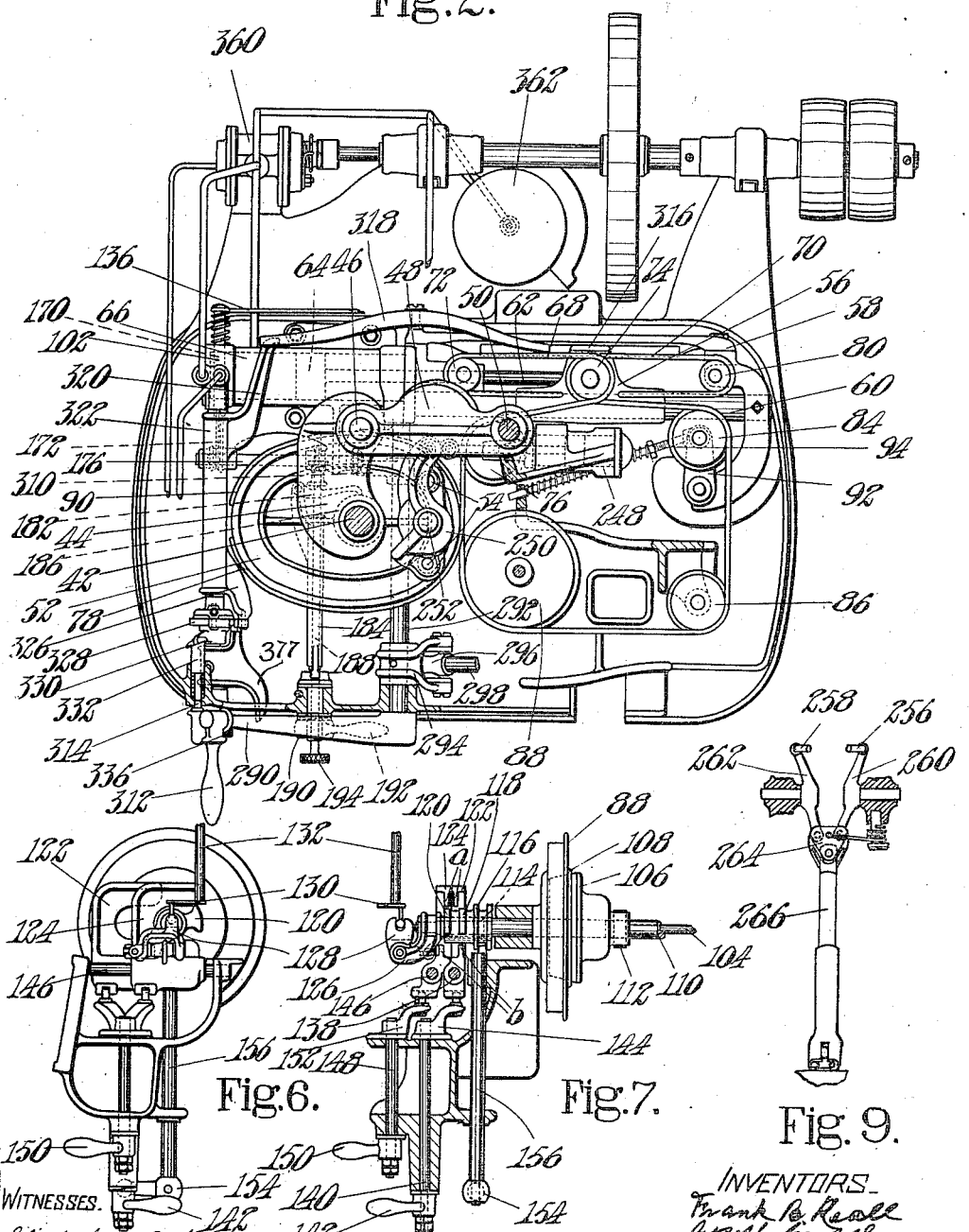

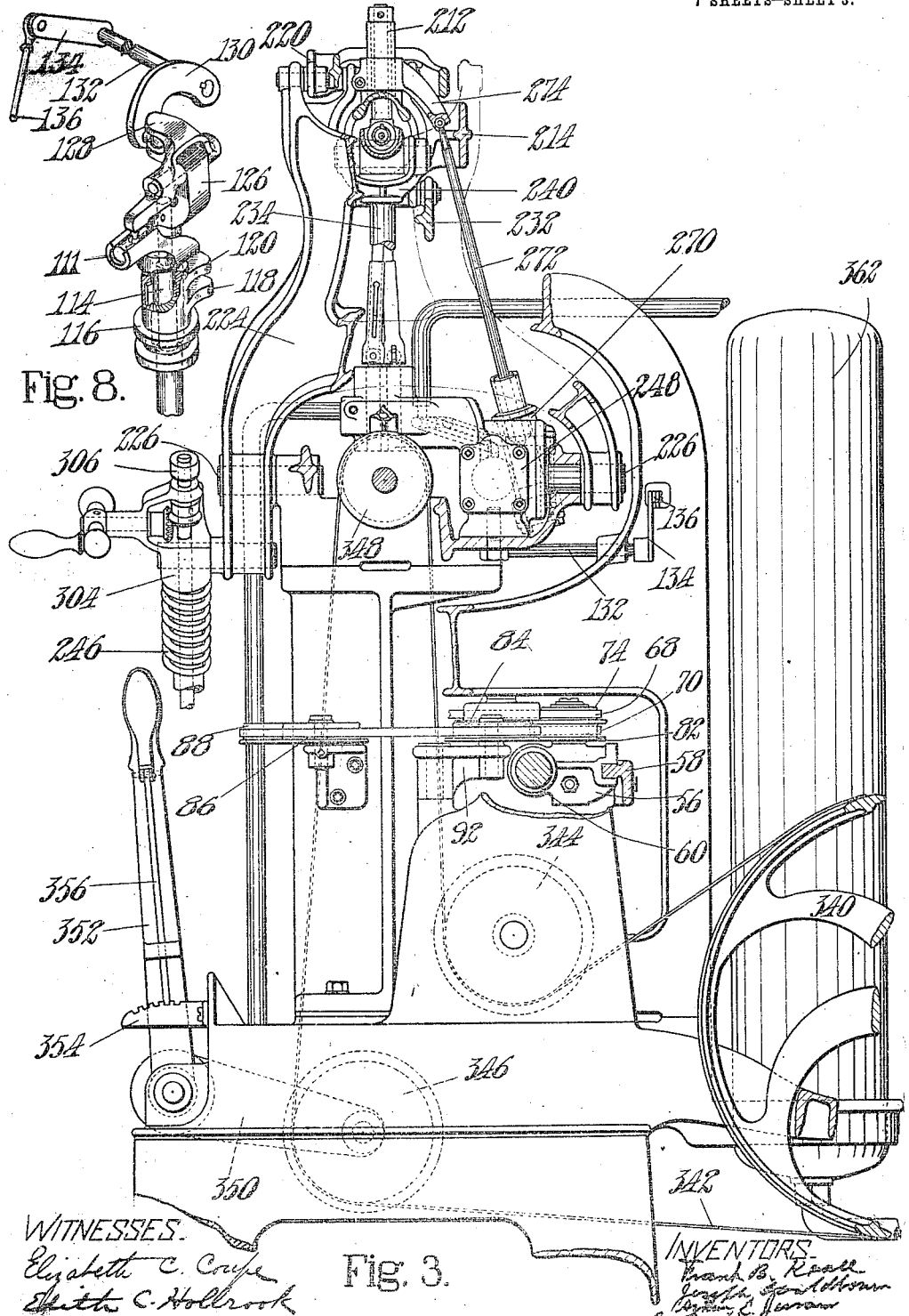

F. B. KEALL, J. GOULDBOURN & A. E. JERRAM.
MACHINE FOR OPERATING ON SHOES.
APPLICATION FILED JULY 3, 1909.
1,078,684.
Patented Nov. 18, 1913.
7 SHEETS—SHEET 5.
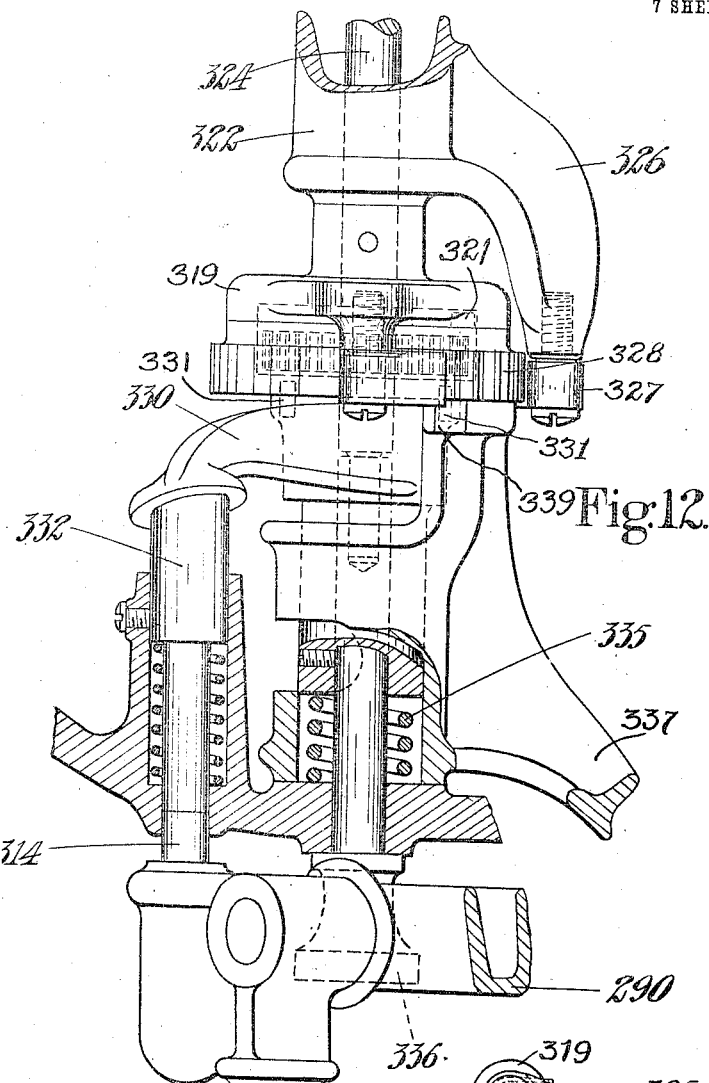
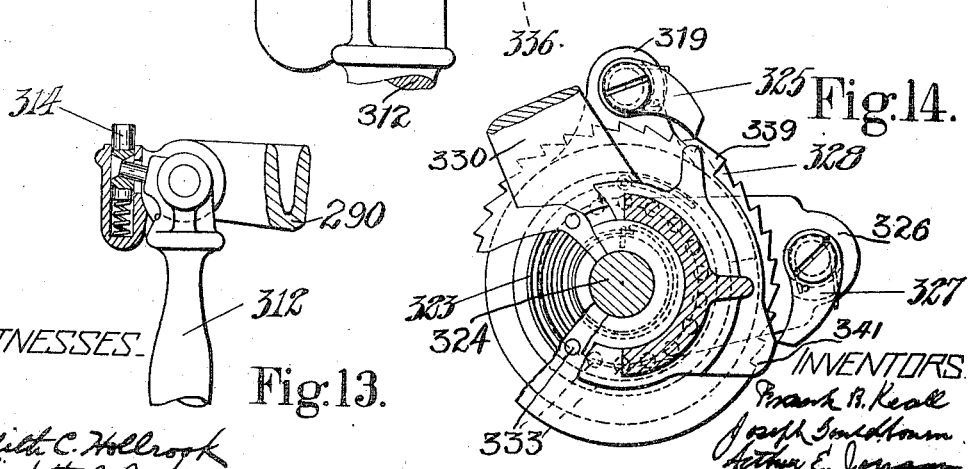

F. B. KEALL, J. GOULDBOURN & A. E. JERRAM.
MACHINE FOR OPERATING ON SHOES.
APPLICATION FILED JULY 3, 1909.

1,078,684.

Patented Nov. 18, 1913.

7 SHEETS—SHEET 6.

WITNESSES.
Elizabeth C. Coupe
Edith C. Holbrook

INVENTORS
Frank B. Keall
Joseph Gouldbourn
Arthur E. Jerram

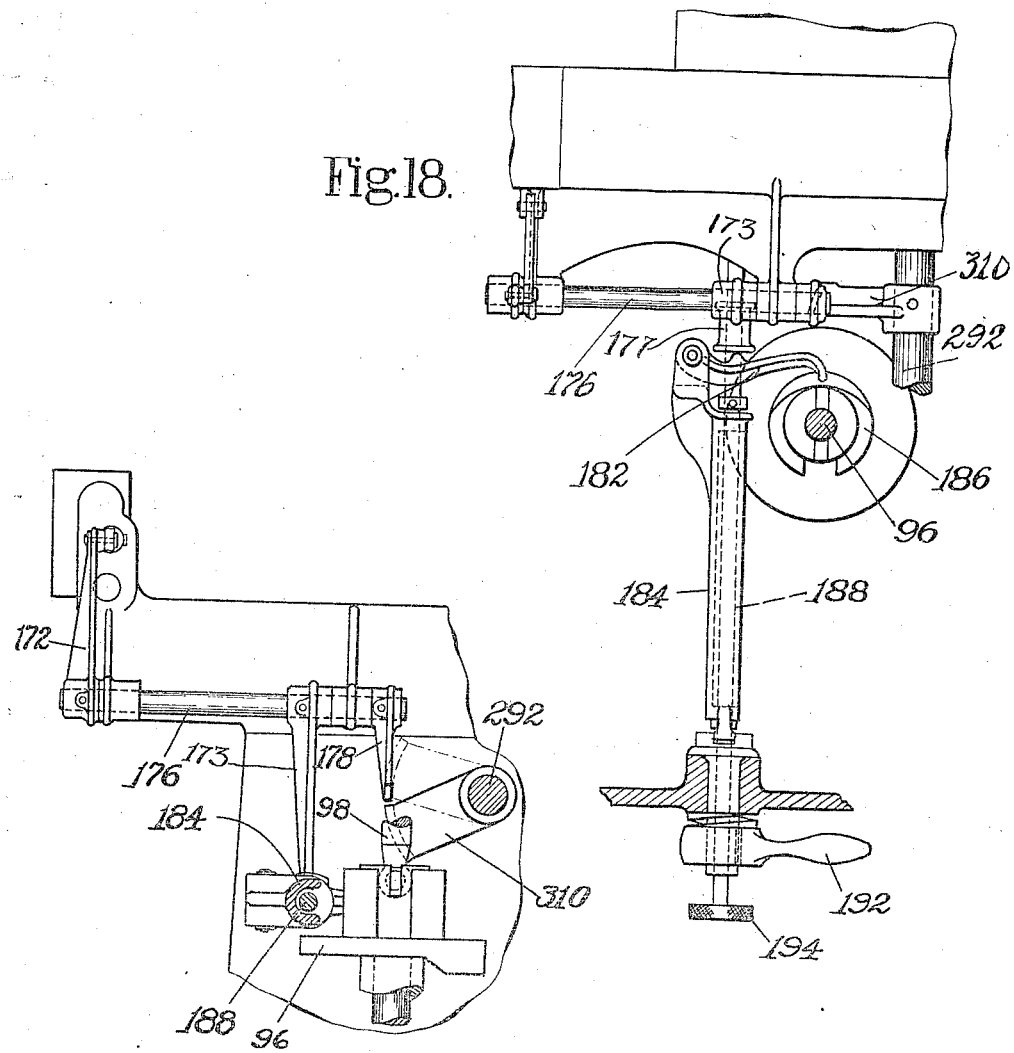

UNITED STATES PATENT OFFICE.

FRANK B. KEALL, JOSEPH GOULDBOURN, AND ARTHUR E. JERRAM, OF LEICESTER, ENGLAND, ASSIGNORS TO UNITED SHOE MACHINERY COMPANY, OF PATERSON, NEW JERSEY, A CORPORATION OF NEW JERSEY.

MACHINE FOR OPERATING ON SHOES.

1,078,684.

Specification of Letters Patent.

Patented Nov. 18, 1913.

Application filed July 3, 1909. Serial No. 595,826.

*To all whom it may concern:*

Be it known that we, FRANK B. KEALL, JOSEPH GOULDBOURN, and ARTHUR E. JERRAM, subjects of the King of England, residing at Leicester, in the county of Leicester, England, have invented certain Improvements in Machines for Operating on Shoes, of which the following description, in connection with the accompanying drawings, is a specification, like reference characters on the drawings indicating like parts in the several figures.

This invention relates primarily to machines of the general type disclosed in the co-pending United States application Ser. No. 455,211, on which was issued Patent No. 1,048,174, granted December 24, 1912. While the machine disclosed in said application is not limited in scope to operation on work of any particular kind, it has special utility in the manufacture of boots, shoes and other footwear, hereinafter referred to as "shoes", and particularly in operations on the soles of shoes.

The chief object of the present invention is to improve and develop the type of machine shown in the application above mentioned; and particularly to render the machine automatic to such a degree, that, while capable of producing a high grade of work, it shall require a minimum of attention and skill on the part of the operator.

In machines of this general character previously proposed, mechanism has usually been provided for producing such relative movement of the tool and work that the tool operates along a predetermined path or contour of the work, and it is frequently necessary in order to produce satisfactory results in certain operations, such for example as "edge setting", to have the tool operate along such path or contour a plurality of times. It is also desirable that the operator shall be able to predetermine and vary the extent of the operation or relative traverse of the tool along its path of operation. To effect these results constitutes an important object of the present invention; to which end the invention, in its preferred form, comprises the provision in a machine having means for producing such relative movement of the tool and work that the tool operates along a predetermined contour of the work, of means for reversing such movement at predetermined points in said contour, and means for independently varying the points of reversal.

A further important feature of the present invention is the use of mechanism that is controlled by the shoe contour for the purpose of determining the position of the point at which automatic reversal or automatic termination of traverse occurs. The manner in which the shoe is enabled to determine this position will be indicated, by way of example, in the description of a preferred embodiment of the present invention which forms a later portion of this specification.

Between portions of the shoe-margin shaped to uniform curvatures, another portion, say that at the junction of the shank with the fore-part, is of different and often of varying curvature. This portion, if referred to the angular movement of the jack, extends through angles which differ, in different styles of shoe or different shoes of the same style and it is not desirable to determine the traverse of this particular portion by correspondingly varying the relative angular motion of the tool and jack, but instead to determine the relative traverse by the linear extent of this particular portion, which is practically constant. Accordingly the present invention contemplates the employment of a mechanism which, although it ultimately effects the automatic reversal or termination of the relative traverse, has its action initiated upon the arrival of the jack and tool in a predetermined relationship; namely, that positional relationship at which the uniformly curved portion ends, and has its action completed thereafter when a predetermined linear relative traverse between shoe-margin and tool shall have occurred. Such predetermined linear relative traverse would be the known length measured along the curve of the intermediate portion of the shoe-margin constituting the joining line between the shank and fore-part, the length of this line being, as aforesaid, practically constant, even though its contour varies in shoes of different styles.

Another important object of the invention is the provision of means for readily effecting an adjustment of the machine for operation on both right and left shoes. It is clear that if a tool is operating around a shoe the point at which automatic reversal should take place on the right side of a right shoe differs in location from the corresponding point on the right side of a left shoe. To facilitate operation on work of this character, the invention, in the embodiment illustrated in the accompanying drawings, comprises means for producing relative movement of the work and tool, means for reversing such movement at predetermined points and means for effecting a transfer, with relation to the work, of said points of reversal without changing the extent of relative traverse.

With the purpose of reducing the duties of the operator so far as possible, a further important object of the invention is the provision of means for automatically stopping the operation of the machine when a predetermined number of relative traverses of the tool have been made, and means for varying this number. To this end, the preferred embodiment of the invention comprises means for producing such relative movement of the tool and work that the tool operates along a predetermined contour of the work, means acting automatically to cause the tool to operate one or more times over the work, a controlling lever, a latch for holding said lever in operating position, a device for tripping the latch, and adjustable mechanism for operating said device when a predetermined number of relative traverses has been made.

In operating on certain classes of work for which this machine is designed, the tool is frequently required to operate along a contour of varying curvature, and it is essential to the production of satisfactory results that the rate of relative travel of the tool and work be maintained constant as the tool operates along such a contour. This desideratum may be attained either by the use of automatic means for varying the rate of movement of the driving mechanism as a whole, or by the provision of a lobed cam operated by chains or bands driven from a mechanism having approximately constant linear velocity; the cam being so proportioned relatively to the contour of the work as to render uniform the transmitted motion of traverse which otherwise would be variable. Preferably, however, these two mechanisms are combined in one machine, the effect of one being employed to modify that of the other.

The invention also comprises an improved mounting for the tool, a novel construction of jack, improved supporting and operating mechanism for the jack, a simplified construction of the controlling devices for the correcting mechanism and other features of construction and operation not specifically referred to in the foregoing statement, but which will be fully described hereinafter and for which protection will be sought in the appended claims.

The invention will now be described, with the aid of the accompanying drawings, as embodied in a machine for setting or burnishing the edges of boots or shoes.

Figure 4:
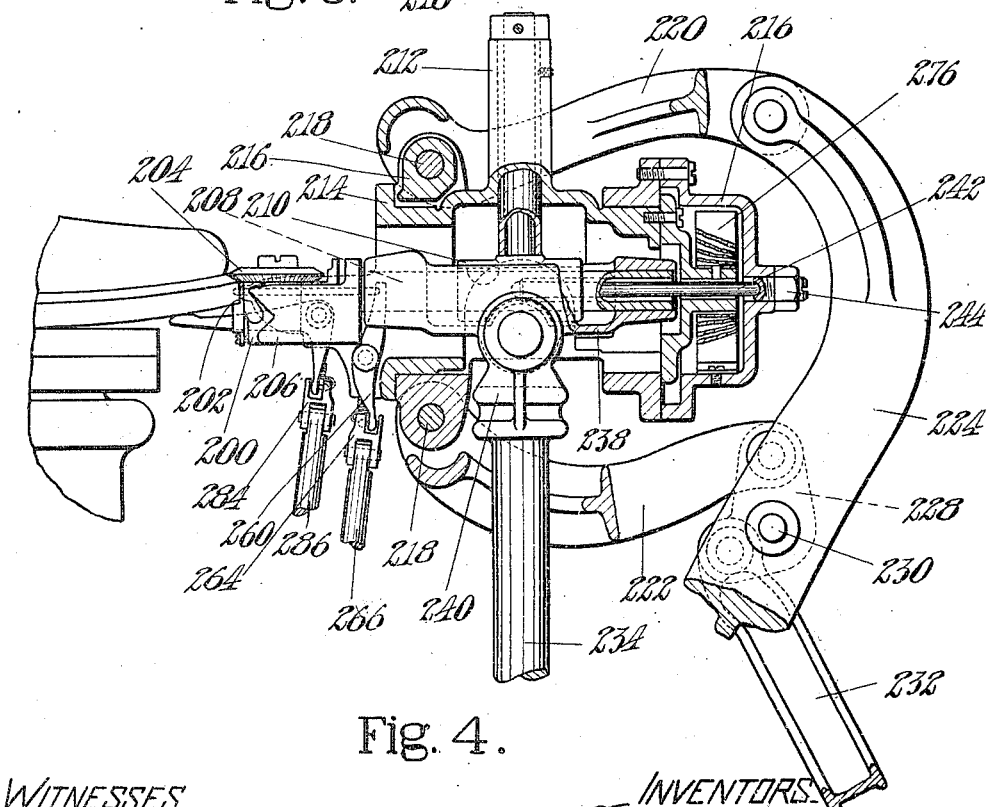
Figure 15:
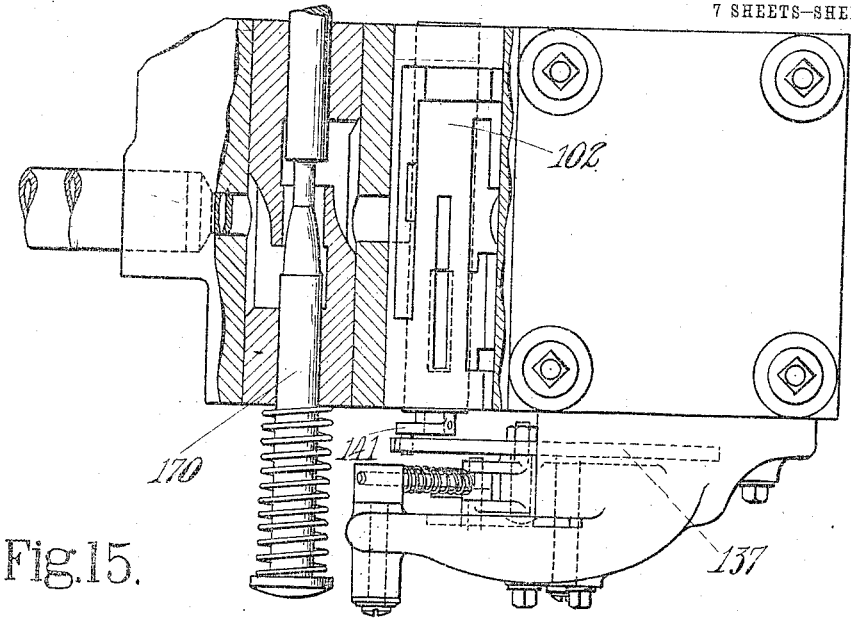
Figure 16:
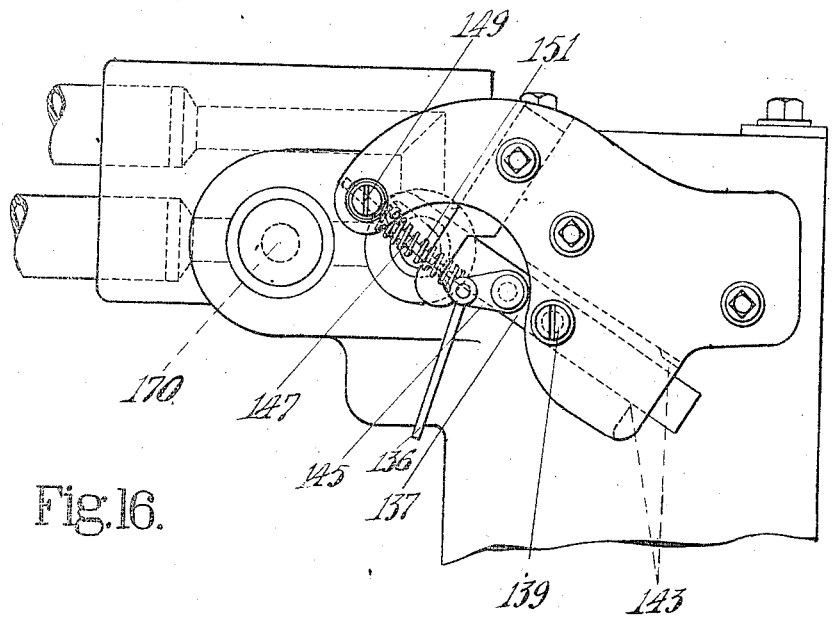
Figure 17:
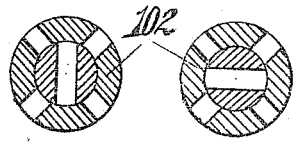

In the accompanying drawings,—Figure 1 is a front elevation of the machine with a part of the frame broken away to show the internal construction. Fig. 2 is a plan view of the machine shown in Fig. 1 with the upper part removed. Fig. 3 is a side view of a portion of the machine shown in Fig. 1 drawn to a larger scale, with certain parts in section. Fig. 4 is a vertical section showing in detail the tool carrying head. Fig. 5 is a plan partly in section of the parts shown in Fig. 4. Fig. 6 is a view showing in detail part of the jack reversing mechanism. Fig. 7 is a section of the parts shown in Fig. 6 but turned around so as to correspond with that figure for the sake of convenience. Fig. 8 is a perspective view of parts shown in Figs. 6 and 7. Fig. 9 is a front elevation showing certain details of the feeler mechanism. Fig. 10 shows in cross section the construction of the dash pot which is attached to the valve spindle. Fig. 11 is a detail to be referred to. Figs. 12, 13 and 14 are views showing in a larger scale the details of construction of the counting mechanism. Figs. 15, 16 and 17 show the detailed construction of the valves which control the supply of fluid to the main hydraulic cylinder. Figs. 18 and 19 show details of certain mechanism for operating the valve that controls the flow of liquid to the main hydraulic cylinder.

In this specification it is to be understood that by the path of relative traverse of the tool is meant that path in which during the relative motion of the tool and work the tool is in active operation on the work; and it is contemplated that this path may be shorter than the extent of relative movement of the tool and work, since these members may be so controlled as to move clear of each other before the relative motion of tool and work has ceased.

The machine comprises a jack or work support upon which the boot or shoe is securely held and an edge setting tool that has rapid vibratory movements of small amplitude imparted to it to burnish the sole edge of the shoe with which it is maintained in engagement.

The jack comprises a frame 2 of a laterally-disposed U shape on the lower arm of which is a dove-tailed slideway 4 that supports an adjustable block 6 for engaging and positioning the tread face of the sole of the shoe; this block may be adjusted longitudinally of the shoe along the slideway and be retained in its adjusted position by any suitable means such as a spring plunger 8 so located in the frame as to engage suitably shaped recesses in the block 6. Toward the bend of the U-shaped frame there is an adjustable, vertically-disposed rest 10 for the tread face of the heel of the shoe.

A U-shaped clamp 12 adapted to embrace the counter part of the shoe so as to position it centrally in the jack is adjustably mounted in the bend of the frame.

The shoe is held upon the jack by a pendent clamp member 14 carried in the upper arm of the frame so as to engage the shoe and hold it firmly in the jack.

The clamp 14 is carried on the lower end of a plunger 16 that is movable toward and from the work by means of a toggle 18 (see Fig. 11) that may be straightened to clamp the work by means of a handle 20.

To accommodate varying sizes of work one member of the toggle which constitutes an extension from the handle is pivoted at 22 to a sliding sleeve or floating support 24 which is adjustable toward or from the work by means of a screw 26 provided with a hand wheel 28. The screw 26 encircles the plunger 16 and is journaled in the overhanging arm of the jack and screws into the sleeve 24. A washer 30 constitutes a thrust bearing for the screw 26 and rests upon a flange formed within the bearing on the frame.

In order that slight variations in the size of the shoe may not necessitate adjustment of the clamp, a spring 32 is provided which encircles the sleeve 24 and is located between the washer 30 and a collar 34 that forms the uppermost bearing for the sleeve 24.

To adjust the degree of compression of the spring 32 the collar 34 bears against a lever 36 which is pivoted at 38 to the frame of the jack. A threaded link 40 pivoted on the frame and extending through the end of the lever 36 is provided with a nut by means of which the lever may be shifted to compress the spring 32 to the extent desired.

The jack and tool are moved relatively by automatic mechanism to transfer the point of operation of the tool around the sole edge, and mechanism, controlled by feelers bearing upon the sole edge and by feelers bearing upon the tread face of the sole near its edge, imparts the relative angular movements between the shoe and tool that are necessary to insure that the acting face of the tool shall bear evenly upon every part of the sole edge upon which it operates.

The jack 2 is secured upon the upper end of a vertical spindle 42 journaled in bearings at one end of a frame 44 of which the other end is pivotally carried at 46 (see Fig. 2) upon a second frame 48 that swings about a vertical spindle 50 supported in the machine frame. The two frames 44 and 48 in their mean position are disposed approximately at right angles to each other so as to permit horizontal movements of the jack in any direction.

A lobed cam 52 fixed to the lower end of the spindle 42 has a cam groove formed in it which engages two rollers 54, 54 which are supported in a manner hereinafter described. The cam and rollers so guide the jack during its movement that the sole edge of the shoe on the jack moves past the tool in a path agreeing approximately in shape with the contour of the sole edge, or in a path that is the mean of a variety of contours of shoe soles; the relative traverse of the tool and sole edge being brought into exact agreement with the contour of the shoe under operation by the horizontal and vertical movements which are imparted to the jack and tool respectively by the feeler mechanism.

The mechanism for driving the jack 2 comprises a slide 56 that is mounted to reciprocate in guideways 58 and 60 attached to or formed upon the machine frame. The slide 56 is coupled by a piston rod 62 to the piston 64 of a hydraulic cylinder 66 secured to the machine. Motion is transmitted from the slide 56 to the jack by means of two chains or other similar flexible members 68 and 70. The chain 68 is secured to the slide 56 at one end and after passing around pulleys 72, 74 and 76 is attached at its other end at 78 to the cam 52; and the chain 70 also secured to the slide, passes around pulleys 80, 82, 84, 86, 88 as shown in Figs. 2 and 3, and is jointed to the cam at 90. To increase the motion derived from the slide 56 the pulleys 74 and 82 are mounted upon the slide while the remaining pulleys except 84 are carried upon the machine frame. The pulley 84 is carried upon a lever 92 pivoted to the machine frame and is acted upon by a spring pressed rod 94 to keep the chains 68 and 70 under the necessary tension. If desired the chains instead of being attached to the cam 52 may be secured to a pulley of corresponding formation.

By the connections above described the jack is oscillated from side to side by the reciprocation of the slide 56 and the direction of motion of the slide is reversed automatically by the following mechanism:— A reversing cam 96 journaled in the machine frame below the jack spindle 42 is flexibly coupled to said spindle by a universally-jointed connecting shaft 98. The reversing cam 96 partakes of the turning movements of the jack and a high part of the cam is adapted to engage and operate a lever 100 pivoted on the machine frame. The lever 100 by way of adjustable connections presently to be described actuates the valve 102 that controls the supply of fluid to both sides of the piston 64 in the hydraulic cylinder 66 before mentioned.

The point of operation of the tool is transferred along the sole edge of the shoe, from the shank on one side of the sole, around the toe portion, to the shank on the other side of the sole; the direction of motion of the jack being reversed when the tool reaches the shank. To adapt the machine for operation upon shoes of different sizes and styles the points at which reversal takes place are made adjustable. And as shoes of different styles vary in the relative lengths of the sole edge on the inner and outer sides of the sole, each of the said points of reversal is made adjustable independently.

The adjustable connections between the reversing cam 96 and the valve of the hydraulic cylinder 66 are as follows: The lever 100 that is operated by the cam 96 engages the lower end of a spindle 104 movable vertically in the machine frame and coupled to one member 106 of a clutch (Fig. 7) of which the other member 108 is formed upon the guide pulley 88 over which, as aforesaid, the jack actuating chain 70 extends. A vertical rod 110 bored to receive the upper end of the spindle 104 is coupled to the latter by means of a pin and slot connection 112 which causes the rod 110 and the spindle 104 to rotate in company but permits the spindle to be moved endwise independently of the rod to actuate the clutch 106, 108. A sleeve 114 in frictional engagement with the rod 110 has slidingly keyed to it a hub 116 from which two tappet arms 118, 120 extend. These arms are adapted to engage with one or the other of two stop plates 122, 124 (see also Fig. 6) which are mounted in the frame of the machine. Rigidly attached to the top of the rod 110 is an arm 126 (see Fig. 8) on which is pivoted a bell crank lever 128, one end of which is engaged by a projection 111 from the sleeve 114 on the rod 110. The other end of the lever 128 is coupled by a ball-ended connection to an arm 130 on a rock shaft 132 pivoted in the machine frame, another arm 134 on the rock shaft 132 being coupled by a connecting rod 136 (see Figs. 2 and 3) to the valve that controls the supply of fluid to the jack actuating cylinder 64. The point of connection between the arm 130 and the lever 128 is disposed substantially in the axis of the rod 110 so that no movement of the lever 128 other than the movement upon its pivot will operate the rock shaft 132.

The connecting rod 136 is not coupled directly to the valve 102, but as shown in Figs. 15 and 16 is connected through intermediate mechanism which operates to effect a sudden reversal of the valve. This mechanism comprises a lever 137 pivoted to the frame at 139 and having at one end a slot in which is received a pin extending from the valve arm 141. The lever is mounted to oscillate between stop abutments 143. Pivoted to the lever 137 is one member of a pair of toggle members 145 and 147, the latter member having a sliding engagement in a pivot pin 149. A spring 151 is mounted on the toggle member 147 and abuts against the knuckle of the toggle and the pivot pin 149. When the rod 136 is operated the toggles are first straightened until the three pivot pins are in alinement which movement operates to place the spring 151 under compression. Further movement of the rod 136 allows the spring to expand, which it does with a sudden kick, oscillating the lever 137 and throwing the valve 102 into its opposite position.

The stop plate 122 is mounted to slide upon a guide rod 138 secured to the machine frame and the position of the stop plate in relation to the tappet arms 118, 120 can be adjusted by means of a rock shaft 140 that is provided at one end with an operating handle 142 and at the other end with a crank arm 144 that has a pin and slot connection with the stop plate. The stop plate 124 is similarly mounted upon a rod 146 along which it is adjustable by a rock shaft 148 handle 150 and crank arm 152. The operation of this part of the mechanism is as follows:—During rotation of the jack 2 the reversing cam 96 is rotated with the jack until the high part of the cam engages the lever 100 and raises the spindle 104 to force the clutch members 106, 108 into engagement. The rod 110 now rotates with the guide pulley 88 until one of the tappet arms 118, 120 comes into engagement with one of the stop plates 122, 124, thus stopping the movement of the sleeve 114 to which the hub 116 of the arms 118, 120 is keyed. The continued rotation of the rod 110 moves the arm 126 in relation to the projection 111 from the sleeve so that the lever 128 is moved upon its pivot to actuate the valve of the cylinder to change the direction of flow of the fluid in the latter. The motion of the jack is now reversed in direction until the reversing cam operates by the connections above described to cause the other of the two tappet arms to engage the corresponding stop plate and thus restore to the jack its original direction of motion. The direction of motion of the jack is thus reversed at each end of its stroke, the exact point of reversal depending upon the position into which the stop plates have been adjusted, it being noted that as each stop plate is adjustable independently of its companion each end of the stroke of the jack may be varied independently.

As the tool operates along the sole edge of the shoe, it is always maintained in a position normal to the contour at the point of its engagement by a correcting mechanism, hereinafter described, which angles the jack in a horizontal plane. In order to maintain the tool and shoe in this relation when that portion of the sole margin at the juncture of the shank and forepart is reached, the jack must be turned through a considerable angle. Advantage is taken of this fact by making the high part of the cam 96 of such extent that it actuates the lever 100 and initiates the operation of the reversing mechanism during that period in which the tool is traversing the contour of the sole edge at the juncture of the shank and forepart. While the angle through which the jack must be turned, as the tool traverses this portion of the sole edge, varies widely in shoes of different styles, yet this angle is of considerable extent in any ordinary shoe, and by making the high part of the cam of an extent which is the mean of that required for operation on a great variety of shapes of shoes, the machine may be constructed so that it will operate satisfactorily on practically any style of shoe. It will be clear that in this manner the point at which automatic reversal of the traverse takes place is determined or controlled by the shoe contour; and it will be evident also that while the reversing mechanism has its action initiated upon the arrival of the shoe and jack in a predetermined relation, such action is completed thereafter when a definite linear traverse between the shoe margin and tool shall have occurred; the extent of this traverse being predetermined by the adjustment of the stops 122 and 124.

In operating upon shoes of the same size and style it will be understood that although the total length of travel of the point of operation of the tool is the same for a "right" shoe as for a "left" the points at which reversal of the direction of motion of the jack should take place are different for each shoe; the configuration of the sole edge of the "right" shoe differing only from that of the sole edge of the "left" shoe in that it is reversed laterally.

In order that after the machine has operated upon say a "right" shoe of a given size and style, the points of reversal may be shifted for a "left" shoe of the same size and style without necessitating independent re-adjustment of each of the stop plates 122, 124, each stop plate in the construction herein described has two portions a b which are located at different levels as shown in Fig. 7 so that for any given adjustment one portion only of each stop plate is in operative relation with a tappet arm 118, or 120. Provision is made for effecting a relative shift of the tappet arms 118, 120 and the stop plates 122, 124 so that either portion a or b of the stop plate may be brought into operative relation with a tappet arm.

It is for this purpose of obtaining a ready adjustment for "rights" and "lefts" that two tappet arms are provided and that the hub 116 of the arms is slidingly keyed upon the sleeve 114 on the rod 110. The two portions a b of each stop plate being located at different levels, each tappet arm can be moved into operative relation with either of the said portions of the stop plate to which it appertains by the raising or lowering of the hub 116; and this operation may be effected by means of an operating handle 154 secured to a rockshaft 156 upon which an eccentrically disposed pin is mounted which engages a groove in the hub 116 as shown in Fig. 7.

In operating upon shoes that differ somewhat widely from the normal (for example shoes with pointed toes or shoes with square toes), it will be evident that if the speed of the jack actuating mechanism be maintained constant the edge setting tool will travel over different parts of the sole edge with different velocities. In order to maintain constant the rate of relative travel of the tool in relation to the sole edge of such shoes, mechanism is provided for varying the speed of the piston 64 in the hydraulic cylinder 66. This mechanism comprises a long conical valve 170 for regulating the speed of admission of the fluid to the cylinder. The valve is connected by a link 172, Figs. 2 and 19, to a lever fixed upon a rockshaft 176 journaled in the machine frame, the rockshaft having fixed upon it another lever 178, Figs. 18 and 19, adapted to engage a sliding collar 177 abutting against the central portion of a lever 182 that is pivoted upon a frame 184 rotatably mounted in the machine frame. One end of the lever 182 rests against a speed changing cam 186 formed upon the hub of the cam 52 so as to rotate in unison with the jack 2. The contour of the cam 186 is such that as the jack is moved to present to the tool different parts of the sole edge of the shoe, the lever 182 is actuated by the cam 186 and moves the valve lever to open and close the conical valve 170 to varying extents and thus alter the power supply and hence the speed of the jack so that the relative traverse of the tool and the sole edge is maintained approximately constant in speed at all parts of the sole edge.

It will be noted that due to the lobed construction of the cam 52 and the arrangement of the chains connecting it with the slide 56, the speed of the motion transmitted to the jack is modified, and this motion is preferably made the mean required for the traverse of a variety of shapes of shoes. It will be noted also that combined with this mechanism is the speed changing apparatus just described, comprising the cam 186 and the conical valve 170, which varies the velocity of motion of the entire driving mechanism; and it will be clear that the effect of one of these mechanisms is superposed upon or employed to modify that of the other.

The cam 186 is constructed with different parts having contours shaped in accordance with different shapes of shoes and the lever 182 may be shifted so as to engage any one of the different contours of the cam. To enable this to be done the frame 184, upon which the lever 182 is pivoted is mounted upon a spindle 188 that is carried in the frame of the machine and the frame 184 is slidingly coupled at its end to a bush 190 provided with a handle 192 by means of which the frame 184 may be turned so as to alter the position of the end of the lever 182 upon the surface of the cam 186.

A friction device is provided to maintain the frame 184 and the bush 190 in the positions into which they are adjusted. The spindle 188 that supports the frame 184 upon which the lever 182 is pivoted is screwed at its end into the machine frame; and by turning a knurled head 194 secured to the spindle 188 the frame 184 and with it the lever 182 may be moved so as to shift the valve lever 172 and move the conical valve 170 in or out of its casing. This adjustment of the frame 184 accelerates or retards generally the speed of the jack actuating mechanism but it does not alter the relative proportions of the variations in speed that are imparted to it by the cam 186.

The edge setting tool 200 has an acting face 202 to engage the sole edge and is provided with a lip to engage the underside of the sole edge. The upper side of the sole edge preferably is engaged by a stitch wheeling disk 204 that is pivoted upon the tool.

The tool is movably mounted in a holder 206 so that it may turn freely in a vertical plane transverse to the end of the shoe. The shank 208 of the holder 206 is slidingly held in a T-shaped piece 210 fulcrumed in an extension 212 from a sleeve 214 that is rotatably mounted in a bearing frame 216 supported by pivots 218 which couple it to two pairs of twin levers 220, 222. The twin levers 220 are pivoted upon a frame lever 224 pivoted at 226 upon the machine frame. The twin levers 222 are connected to the frame lever 224 by a bell crank lever 228 pivoted at 230 to the frame lever 224. The other end of the bell crank lever 228 is coupled to a projection from the machine frame by means of an anchor link 232. By this construction the tool holder 206 can be vibrated laterally about the fulcrum of the T-shaped piece 210; the sleeve 214 and tool holder 206 can be angled about the common axis of the shank 208 and of the sleeve 214; while the sleeve 214, tool holder 206 and bearing frame 216 during their lateral and vertical movements to follow the sole edge are maintained horizontal by the action of the twin links 220, 222 which in conjunction with the bell crank 228 and link 232 constitute a parallel motion device.

The edge setting tool 200 is vibrated rapidly about the fulcrum of the T-shaped piece 210 by connections from a shaft 234. This shaft may be oscillated by any suitable mechanism but preferably by a mechanism of the type described in the specification of United States Patent No. 1,035,445, granted August 13, 1912. This mechanism is indicated at 236, Fig. 1, and is not herein described as it, in itself, forms no part of the present invention. The mechanism may be conveniently operated from the pulley 348. The shaft 234 is connected with the tool holder 206 by a universal coupling comprising a yoke 238 which engages the shank 208 of the tool holder, and a fork 240 that is secured to the shaft 234 and is pivotally connected with the yoke 238 by a pin disposed at right angles to the shank of the tool holder.

Backward thrust of the tool owing to its pressure upon the work is transmitted to the bearing frame 216 by a thrust rod 242 seated at one end against a set screw 244 screwed into the frame 216, its other end engaging the bottom of a recess in the shank of the tool holder 208, the point of engagement being located at a point in the axis of the T-shaped piece 210.

The tool 200 is pressed against the sole edge of the shoe by means of a spring 246; and by the coöperation of this spring with the cam 52 on the lower end of the spindle 42 of the jack 2 the point of operation of the tool is caused to travel along the sole edge during the movement of the jack. But it is necessary during the movement of the jack that there be angular movement in a horizontal plane between the jack and the tool to maintain always the acting face of the tool in proper engagement with the sole edge at every part of the contour thereof. Further, it is necessary also that the jack and tool be turned relatively about an axis that is normal to the acting face 202 of the tool owing to the fact that all parts of the sole do not lie in the same plane. These movements of adjustment between the jack and the tool are effected automatically by the correcting devices hereinafter described.

The correcting device for angling the jack in a horizontal plane in relation to the tool comprises a hydraulic cylinder 248, the piston rod of which is connected by a link to a jack correcting lever 250 pivoted at 252 to the machine frame. This lever supports the two rollers 54, 54 hereinbefore referred to as engaging the groove in the cam 52 on the lower end of the jack spindle. The valve 254 of the hydraulic cylinder is of the rotary type and is controlled by two feelers 256, 258 which under the action of suitable springs bear upon the sole edge, one on each side of the edge setting tool 200. The feeler 256 is coupled to one end of a lever 260 pivoted upon an extension from the sleeve 214 and the feeler 258 is coupled to a lever 262 also pivoted upon the sleeve 214. The lower ends of the levers 260, 262 are connected by a cross bar 264 (see Fig. 9) which constitutes one element of a universal joint connected to the upper end of a shaft 266 having at its lower end a similar joint with the spindle of the valve 254. The operation of this correcting device is as follows:—When the tool is bearing evenly upon the sole edge, the valve 254 of the cylinder is maintained closed by the connections between it and the feelers 256, 258. But when the feelers are moved relatively to one another by changes in the contour or general direction of the sole edge passing the tool, the levers 260, 262 to which the feelers are coupled will likewise be moved relatively thus angling the cross bar 264 that joins them and transmitting motion by the shaft 266 to the valve 254. The valve being thus actuated causes the piston of the cylinder 248 to be set in motion so that the jack correcting lever 250 is turned upon its pivot 252. The jack 2 being connected to the lever 250 by the rollers 54, 54 and the cam 52 will also be swung about the pivot 252 of the lever 250 as a center until the sole edge of the shoe on the jack is returned by such movement to the position in which the tool bears evenly upon it, by which time the feelers 256, 258 will likewise be restored by the movement of the sole edge to their initial position and they will close the valve 254 and stop the motion of the piston and of the parts connected therewith.

The correcting device that effects a relative turning movement of jack and tool about an axis that is normal to the acting face of the tool, comprises a hydraulic cylinder 270 the piston of which is connected by a thrust rod 272 with an extension 274 from a collar that is secured to the projection 212 from the sleeve 214. A spring 276 connects the sleeve 214 and the frame 216 and opposes the thrust of the rod 272. The valve 278 that regulates the admission of fluid to the cylinder 270, is controlled by two feelers 280, 282 that bear upon the tread face of the sole of the shoe immediately adjacent to the sole edge. These feelers are formed as spring sustained levers pivoted upon extensions from the sleeve 214, the free ends of the levers being coupled by a cross bar 284 connected by a universal coupling and a shaft 286, with the rotary valve of the cylinder 270. The action of this correcting device is similar to that first mentioned, that is to say the feelers 280, 282 being displaced relatively by changes in the contour of the portion of the sole engaged by them, angle the cross bar 284 and turn the valve 278 so that the latter is actuated either to cause the piston of the cylinder 270 to be raised by the admission of fluid or to permit it to be depressed by the action of the spring 276 on the sleeve 214. The sleeve, tool holder and tool are thus turned about the axis of the shank of the latter to restore the sole edge and tool to their original relationship, namely one in which the plane of vibration of the tool coincides with that of the part of the sole edge engaged by it. The angling of the sleeve 214 causes the feelers 280, 282 bearing on the sole to be returned to their normal position thus again actuating the valve 278 and stopping the motion of the piston.

The valves 254 and 278 are preferably of the equilibrium type and may be provided with a dash pot device to nullify the effect of the small tremors apt to be transmitted to the work by the vibration of the tool. The dash pot device may comprise a plate extension or wing, as shown in Fig. 10, formed on the lower end of the valve and turning in an oil bath; and a controlling screw may be employed to vary the dampening action.

It may here be remarked that in order to permit movement of both sets of feelers toward and away from the valves controlled by them as the feelers follow the traverse of the tool the shafts 266 and 286 preferably have a sliding movement with the universal joints, or, as shown, they may be made telescopic and with pin and slot connections so that turning movements only are transmitted to the valve. For a similar reason the connection between the jack-actuating cam 52 and the reversing cam 96 is provided with universal joints having a limited sliding movement to allow for the shifting of the cam 52 by the jack-actuating lever 250 without disturbing the rotational movements transmitted by the cam 52 to the cam 96. The shaft 234 which imparts vibratory movement to the tool is also made telescopic as shown in Fig. 1 to permit the movements of the tool hereinbefore indicated.

To move the tool into engagement with the sole edge or to remove it therefrom, a starting and stopping lever or controlling lever 290 is provided which is fixed upon a rockshaft 292 journaled in the machine frame. The rockshaft 292 has upon it an arm 294 to which is pivotally linked a plunger 296 into which extends a rod 298 free to turn within a bearing upon the frame lever. The spring 246, the function of which is to keep the tool pressed against the sole edge while the machine is in operation, surrounds the rod 298 and abuts at its lower end against a collar 300 supported by projections from a nut 302 working on a screwed portion of the rod 298 and at its upper end against an abutment 304 pivoted on the lever 224. A collar 306 secured to the upper end of the rod 298 operates to limit the movement of the rod in the abutment 304 under the influence of the spring 246. By this construction the tool can be moved yieldingly toward the sole edge and removed positively therefrom. Preferably the plunger 296 works in a dash pot 308 which cushions the movement of the lever 290 and frame lever 224 when the machine is thrown automatically out of action.

A cam 310 on the rockshaft 292 is adapted to engage an arm extended from a lever 178 (see Figs. 18 and 19) that is coupled to the conical valve 170 so that this valve may be shut until the controlling lever 290 has been moved sufficiently to bring the tool into engagement with the work, at which time the valve will be permitted to open by the disengagement of the cam 310 from the arm aforesaid to start the movement of the jack to transfer the point of operation of the tool around the work.

A handle 312 pivoted to the free end of the controlling lever 290 is provided with a tooth 314 adapted to engage an aperture in the machine frame so as to hold the lever in the position which it occupies while the machine is running.

The machine comprises an automatic mechanism that stops its operation after a predetermined number of traverses of the tool around the sole edge. And this number of traverses can be varied by an adjusting device. To this end a tappet piece 316 on the reciprocating slide 56 that forms part of the jack actuating mechanism is adapted to engage one end of a lever 318 pivoted upon the machine frame. The other end of the lever engages an arm 320 of a rocking frame 322 that turns upon a spindle 324 supported in the machine frame. Another arm 326 (see Figs. 2, 12 and 14) on the frame 322 carries a pawl 327 that engages a ratchet wheel 328 that has coupled to it an arm 330. This arm has a cam face that is brought by rotation of the ratchet wheel 328 into engagement with a spring-pressed plunger 332 mounted in the machine frame. The plunger 332 when moved endwise by the cam face of the arm 330 forces the tooth 314 on the handle 312 out of the aperture in the machine frame thus releasing the controlling lever 290 and allowing the tool and its supporting device to fall away from the work. In the operation of this automatic mechanism the ratchet wheel 328 is moved by the connections from the tappet piece 316 at each reciprocation of the slide 56 until the slide, and consequently the jack, has made the number of movements for which the mechanism is set, when the cam arm 330 will release the controlling lever 290, the tool will move away from the work and the cam 310 on the rockshaft 292 of the controlling lever 290 will operate to shut the conical valve 170 and stop the movement of the jack.

An arm 319 fixed to the spindle 324 that supports the rocking frame 322 acts as a stop for a pin 321, Fig. 12, projecting rearwardly from the ratchet wheel 328 so that the wheel when the machine is stopped may be returned by a spring 323 always to the same starting position. During the operation of the machine reverse movement of the ratchet wheel 328 is prevented by a stop pawl 325 pivoted to the arm on the spindle 324 of the rocking frame 322.

Means preferably are provided for releasing both pawls 325 and 327 from the ratchet wheel 328 when the controlling lever 290 is released and such means may be operated automatically by the movement of the lever or some associated part. The construction shown comprises a sleeve loosely mounted on the hub of the cam arm 330 and having projecting therefrom an integral arm 337, Figs. 2 and 12, which extends through the machine frame into position to be engaged and moved downwardly by the controlling lever 290 when said lever is in its operative position. This sleeve is provided at its end opposite the arm 337 with two cam-shaped lugs 339 and 341 which are positioned to engage respectively the pawls 325 and 327 and move them out of contact with the ratchet wheel 328. When the controlling lever 290 is moved into its operative position, it engages the arm 337 and tips it downwardly, thus turning the lugs 339 and 341 in a clockwise direction, as viewed in Fig. 14, and moving them out of contact with the pawls 325 and 327, which thereupon move again into engagement with the ratchet wheel 328. Upon the movement of the controlling lever into inoperative position, the arm 337 is released and a spring acts on it to turn the sleeve and the lugs 339 and 341 in a counter-clockwise direction and into the positions in which they are shown in Fig. 14.

In order to adjust the number of movements of the jack that occur before the machine is stopped the arm 330 is adjustable with relation to the ratchet wheel 328 so that it has a longer or shorter travel before engaging the pin 332. To this end the ratchet wheel 328 is coupled to the arm 330 by two dowel pins 331 adapted to engage with any opposite pair of a series of holes 333 in the hub of the arm and arranged concentrically with the axis about which the ratchet wheel moves. A spring 335 maintains the arm 330 in engagement with the dowel pins but the arm may be moved by a knurled handle 336 secured to its hub so as to withdraw it from the dowel pins, rotate it with relation to the ratchet wheel 328 and then connect it again therewith by permitting the dowel pins to engage another pair of the series of holes in the hub of the arm 330.

The machine is provided with a belt-tightening device to enable the mechanism 236 that imparts vibratory movements to the edge-setting tool to be connected with and disconnected from the source of power. As shown in the drawings this comprises a driving pulley 340 having a belt 342 which passes around idle pulleys 344, 346 and over a pulley 348 on the shaft carrying the mechanism 236 hereinbefore referred to. The pulley 346 is mounted on one end of a lever 350 pivoted upon the machine frame and being connected to a lever 352 by which the pulley 346 can be moved to slacken the belt and so stop the machine. A latch plate 354 is provided to hold the lever by means of a spring detent 356 in its operative position.

A pump 360 is provided which supplies fluid under the requisite pressure to the hydraulic cylinders of the machine and there is an air chamber 362 into which the fluid is pumped before passing to the hydraulic cylinders.

It is to be noted that the means described herein for determining the point at which shall occur reversal of the direction of motion of the point of operation of the tool around the work forms an important feature of the present invention, and it is within the scope of the invention to provide any convenient means for effecting the said reversal which are brought into action when the tool and the work have been turned relatively through a predetermined angle or are brought into action when the tool and the work have been traversed relatively a predetermined distance after they have been turned through such angle. The special advantage of thus predetermining the point at which such reversal shall occur is that the point of reversal being dependent only upon the relative angular position of the work and tool, variations in the position of the work upon the jack in directions longitudinally or laterally of the jack will not alter the position of the point of contact of the tool and work at which the reversal takes place. Furthermore, in trimming a shoe sole at the point of junction of the waist and forepart, a less accurately trimmed portion is produced by the merging of the parts trimmed by the waist and forepart cutters and therefore by limiting the relative traverse of the work and tool to a certain definite amount beyond a certain relative angular position of the work and tool, it is possible (in cases where such angular movements of the tool and work are controlled by devices bearing upon the work) to gage the reversing point from an accurately trimmed portion of the shoe.

Having described our invention, what we claim as new and desire to secure by Letters Patent of the United States is:—

1. A machine of the class described, comprising in combination, a work support, a tool, means for producing such relative movement of the work and tool that the tool will operate along a predetermined path, means for predetermining the limiting points of said operation, and means for effecting a transfer of said limiting points relatively to the work while maintaining substantially constant the extent of said operation.

2. A machine in which a tool is caused to operate along a contour of a shoe, comprising means for predetermining the limiting point of said operation on each side of the shoe, and means for effecting simultaneously a relative adjustment of said points for right and left shoes.

3. A machine in which a tool is caused to operate along a contour of a shoe, comprising means for reversing the operation of said machine at two predetermined points in said contour, and means for simultaneously shifting said points of reversal in opposite directions.

4. A machine in which a tool is caused to operate along a predetermined contour of a shoe, comprising automatic mechanism for reversing such operation at two predetermined points in said contour, and means whereby said points of reversal may be shifted simultaneously to accommodate either right or left shoes.

5. A machine in which a tool is caused to operate along a predetermined contour of a shoe, comprising in combination means for causing the tool to operate over said contour a plurality of times, means for adjusting the limiting point of said operation on each side of the shoe, and means for simultaneously shifting the limiting points to facilitate operation on either right or left shoes.

6. A machine of the class described, comprising in combination, a shoe support, a tool, mechanism for producing such relative movement of the shoe and tool that the tool will operate along a predetermined contour of the shoe, and means for predetermining the extent of said operation, said means being constructed and arranged to have its action initiated upon the arrival of the shoe and tool in a predetermined relationship and completed when a predetermined relative traverse of the shoe and tool has taken place after said initiating action has occurred.

7. A machine in which a tool is caused to operate along a contour of a shoe, comprising mechanism for predetermining the extent of said operation constructed and arranged to have its action initiated upon the arrival of the work and tool in a predetermined relationship and completed thereafter when a predetermined relative linear traverse of the work and tool shall have occurred, and means for varying the extent of said relative linear traverse.

8. A machine for operating on shoes, comprising in combination, a work support, a tool, means for producing relative movement of the work and tool, and mechanism for automatically reversing said movement at a predetermined point, said mechanism being constructed and arranged to have its action initiated upon the arrival of the work and tool in a predetermined relationship and completed thereafter when a predetermined relative linear traverse of the work and tool shall have occurred.

9. A machine for operating on shoes, comprising in combination, a work support, a tool, means for producing relative movement of the work and tool, mechanism for automatically reversing said movement at predetermined points, said mechanism being constructed and arranged to have its action initiated upon the arrival of the work and tool in predetermined angular relationships and completed thereafter when a predetermined relative linear traverse of the tool and work shall have occurred, and means for varying the extent of said linear traverse.

10. A machine for operating upon shoes comprising, in combination, a tool, means for producing relative movement of the tool and shoe to transfer the point of operation of the tool along the shoe, and mechanism controlled by the shoe for determining the extent of the operation of the tool on the shoe.

11. A machine for operating upon shoes comprising, in combination, a tool, means for producing relative movement of the tool and shoe to transfer the point of operation of the tool along the shoe, and mechanism controlled by the contour over which the tool operates for limiting the extent of said operation.

12. A machine for operating upon shoes comprising, in combination, a tool, means for producing a relative movement of the tool and shoe to transfer the point of operation of the tool along the shoe, means controlled by the shoe for limiting automatically the extent of operation of the tool along the shoe, and means whereby said extent of operation may be varied.

13. A machine for operating upon shoes comprising, in combination, a tool, means for producing a relative movement of the tool and shoe to transfer the point of operation of the tool along the shoe, means controlled by the work for automatically limiting the extent of operation of the tool on each side of the shoe, and means whereby the extent of said operation on either side of the shoe may be adjusted independently of the other.

14. A machine for operating on shoes comprising in combination, a work support, a tool, means for producing relative movement of the work and tool, and mechanism controlled by the work for automatically reversing said movement at a predetermined point.

15. A machine of the class described, comprising in combination, a work support, a tool, driving mechanism for one of said members, a valve controlling said driving mechanism, a cam operated by the driving mechanism, and means controlled by said cam for operating said valve to reverse said driving mechanism.

16. A machine of the class described, comprising in combination, a work support, driving mechanism therefor, a valve controlling said driving mechanism, a cam operatively connected with said work support, a clutch controlled by the cam, power operated means for driving one member of said clutch, a shaft connected to another member of said clutch, a tappet sleeve on said shaft, an adjustable stop coöperating with the tappet of said sleeve, and connections between said sleeve and valve for operating the latter to reverse the movement of said driving mechanism.

17. In a machine of the class described, the combination with a work support, a tool, and driving means for one of said members, of a reversing mechanism for said driving means comprising a tappet, a stop therefor having two abutments and means for effecting a relative shift in position between said tappet and stop.

18. In a machine of the class described, the combination with a work support, a tool, and driving means for one of said members, of reversing mechanism for said driving means comprising a shaft, a sleeve slidably secured thereon, two tappets on said sleeve, an adjustable stop for each of said tappets, each stop having two abutments, and means for adjusting said tappets into position to engage either set of abutments.

19. A machine in which a tool is caused to operate along a predetermined contour of a shoe, comprising mechanism for causing said tool to operate over said contour a plurality of times, means for predetermining the number of said operations, and means whereby this number may be varied.

20. A machine in which a tool is caused to operate along a contour of a shoe, comprising means for independently predetermining the limits of said operation, mechanism for producing a plurality of such operations, and means for automatically stopping the operation of the tool after a predetermined number of operations have been made.

21. A machine in which a tool is caused to operate along a predetermined contour of a shoe, comprising mechanism for causing said tool to operate over said contour a plurality of times, and adjustable means including a step-by-step mechanism for predetermining the number of said operations.

22. A machine in which a tool is caused to operate along a predetermined contour of a shoe, comprising driving mechanism for producing a plurality of such operations, a cam operated by the driving mechanism, and means controlled by said cam for stopping the operation of the driving mechanism.

23. In a machine of the class described, the combination of a shoe support, a tool, driving mechanism for producing relative movement of said support and tool to transfer the point of operation of the tool over the shoe, means for holding the tool and shoe in operative engagement, and mechanism for automatically stopping said relative movement and effecting an interruption of said engagement.

24. A machine of the class described, comprising in combination, a work support, driving mechanism therefor, a controlling lever, a latch for holding said lever in operative position, a cam for tripping said latch and thereby releasing the lever to stop the machine, and an adjustable pawl and ratchet connection between said cam and driving mechanism.

25. In a machine of the class described, the combination with a work support and a tool, of means for producing relative movement of the work support and tool, comprising a cam, a reciprocating plunger, and flexible driving connections between the cam and plunger.

26. In a machine of the class described, the combination with a work support and a tool, of mechanism for producing relative movement of the work support and tool, comprising a cam, a reciprocating plunger, a plurality of guiding pulleys, flexible driving connections between said cam and plunger guided on said pulleys, and means for maintaining said driving connections under tension.

27. A machine for operating on shoes, comprising in combination, a work support, a tool, and means for producing an approximately constant rate of relative movement between the tool and the path of the work along which the tool acts, comprising a power driven mechanism, a lobed cam through which said movement is transmitted, and flexible driving means connecting said mechanism and cam.

28. A machine for operating on shoes, comprising in combination, a work support, a tool, mechanism for producing a constant rate of relative movement between the tool and the path of the work along which the tool acts, comprising a power driven mechanism, a lobed cam, flexible driving means connecting said mechanism and cam, and means for varying the speed of said power driven mechanism.

29. A machine in which a tool is caused to operate along a predetermined contour of a shoe, comprising in combination means for producing relative movement of the shoe and tool, and cam controlled means for rendering constant the rate of relative travel of the tool along said contour.

30. In a machine of the class described, the combination with a work support, a tool, and power operated means for producing relative movement of the work support and tool, of mechanism for rendering uniform the rate of relative travel of said tool along the work, comprising a cam and devices controlled by the cam for varying the power supplied to said means.

31. A machine of the class described, comprising in combination, a work support, fluid pressure operated mechanism for driving said support, a valve controlling the supply of fluid to said mechanism, a cam driven by said mechanism, and connections between said cam and valve whereby the valve is controlled by said cam.

32. A machine of the class described, comprising in combination, a work support, a tool, means for producing relative movement of the work and tool, and mechanism for rendering uniform the rate of relative travel of the tool along the work comprising a plurality of cams, and a lever adjustable into contact with either of said cams.

33. A machine of the class described, comprising in combination, a work support, a tool, power operated means for producing relative movement of the work and tool, and mechanism for rendering uniform the rate of relative travel of the tool along the work, comprising a plurality of cams corresponding to different patterns of work to be operated on, a lever arranged to engage either one of said cams, and devices controlled by the lever for varying the power supplied to said means.

34. A machine of the class described, comprising in combination, a work support mounted for movement about a plurality of axes, a tool coöperating therewith and also mounted for movement about a plurality of axes, and means for imparting to one of said devices a rapid to-and-fro movement.

35. A machine of the class described, comprising in combination, a work support mounted for movement about a plurality of axes, and a tool coöperating therewith and mounted for movement about a plurality of axes and also for movements of translation in different directions.

36. A machine of the class described, comprising in combination, a tool, a carrier therefor constructed and arranged to permit movement of said tool about a plurality of axes, and a parallel motion device on which said carrier is mounted.

37. A machine of the class described, comprising in combination, a tool, a carrier therefor constructed and arranged to permit movement of said tool about three axes at right angles to each other, and a parallel motion device on which said carrier is mounted.

38. A machine of the class described, comprising in combination, a tool, a carrier therefor constructed and arranged to permit movement of said tool about a plurality of axes at right angles to each other, a parallel motion device on which said carrier is mounted, and means for giving said tool a rapid to-and-fro movement.

39. A machine of the class described, comprising in combination, a tool, a carrier therefor, means for imparting to said tool a rapid to-and-fro movement, a parallel motion device on which said carrier is mounted, yielding means for moving said carrier in one direction, and means whereby said carrier may be positively moved in the opposite direction.

40. A machine of the class described, comprising in combination, a work support mounted for movement about a plurality of axes, a tool coöperating therewith and also mounted for movement about a plurality of axes, means for imparting to one of said devices a rapid to-and-fro movement, and means for yieldingly holding the tool and work in engagement with each other.

41. A machine of the class described, comprising in combination a shoe supporting jack, a shaft supporting said jack, a pivoted frame in which said shaft is mounted, a second pivoted frame to which the first frame is pivoted, a cam rigidly secured to said shaft, and mechanism for driving said cam.

42. A machine of the class described, comprising in combination a jack, a shaft supporting said jack, a pivoted frame in which said jack is mounted, a second pivoted frame to which the first frame is pivoted, a cam rigidly secured to said shaft, a reciprocating piston, flexible driving connections between said cam and piston, and guiding means coöperating with said cam for determining the path of movement of said jack.

43. A machine of the class described, comprising in combination a work support, a tool for operating on the work, feelers arranged to engage the work, mechanism controlled by the feelers for correcting the relative position of tool and work, and extensible connections between the feelers and said mechanism.

44. A machine of the class described, comprising in combination a work support, a tool for operating on the work, feelers arranged to engage the work, mechanism controlled by the feelers for correcting the relative position of tool and work, and connections between the feelers and said mechanism constructed and arranged to transmit turning movements only.

45. A machine of the class described, comprising in combination a tool, a holder in which said tool is mounted, a sleeve to which said holder is pivoted, a frame in which said sleeve is pivotally mounted, the axes of said pivots intersecting at a point in the holder, and a thrust rod interposed between the holder and frame, one end of the rod engaging the holder at said point of intersection.

46. A machine of the class described, comprising in combination a work support, a tool for operating on the work, a carrier for said tool constructed and arranged to permit movement of the tool about a plurality of axes at right angles to each other, means for imparting to said tool a rapid to-and-fro movement, feelers arranged to engage the work, and mechanism controlled by the feelers for correcting the relative position of tool and work.

47. A machine of the class described, comprising in combination a work support, means for securing the work thereon, a tool for operating on the work, a carrier for said tool constructed and arranged to permit it to move about a plurality of axes, means for yieldingly holding said tool in engagement with the work, feelers arranged to engage the work, means controlled by the feelers for correcting the relative position of tool and work, means for producing relative movement of the tool and work, and automatic mechanism for reversing said movement at a predetermined point.

48. A machine of the class described, comprising in combination a work support, means for clamping the work thereon, a tool for operating on the work, a carrier for said tool constructed and arranged to permit it to move about a plurality of axes, means for yieldingly holding said tool in engagement with the work, feelers engaging the work, mechanism controlled by the feelers for correcting the relative position of tool and work, means for causing the point of operation of the tool to be transferred over the same path on the work a plurality of times, and means for automatically stopping the operation of the machine when a predetermined number of such transfers have been made.

49. A machine of the class described, comprising in combination, a shoe support, a tool, driving mechanism for moving said support to transfer the point of operation of the tool along the shoe, a rotatable cam connected with said support to be moved thereby, and means controlled by said cam for interrupting the operation of the tool along the shoe.

50. A machine of the class described, comprising in combination, a shoe support, a tool, driving mechanism for moving said support to transfer the point of operation of the tool over the shoe, and means for limiting the extent of operation of the tool on the shoe comprising a cam connected with said support to be moved thereby, said means being constructed to have its action initiated by said cam and completed thereafter when a predetermined extent of operation of the tool on the shoe shall have occurred.

51. A machine of the class described, comprising in combination, a shoe support, a tool, driving mechanism for moving said support to transfer the point of operation of the tool over the shoe, means for limiting the extent of operation of the tool on the shoe comprising a cam connected with said support to be moved thereby, said means being constructed to have its action initiated by said cam and completed thereafter when a predetermined movement of said shoe support with relation to said tool shall have occurred, and means for independently adjusting the extent of said predetermined movement near the ends of the relative travel of said tool on the shoe whereby the limiting points of the operation of the tool on the shoe can be independently varied.

52. In a machine of the class described, the combination of a shoe support, a tool, means for moving said support to transfer the point of operation of the tool along the shoe, means for holding said tool in operative engagement with the shoe, said means comprising a latch, and mechanism operated by said driving means for tripping said latch to release the tool from engagement with the shoe.

53. In a machine of the class described, the combination of a shoe support, an edge setting tool, means for moving said support to transfer the point of operation of said tool along the shoe sole, means for holding said tool and shoe in operative engagement, means for causing said tool to operate over the shoe a plurality of times, and means for automatically effecting an interruption of the engagement between the tool and shoe when a predetermined number of such operations have been made.

In testimony whereof we have signed our names to this specification in the presence of two subscribing witnesses.

FRANK B. KEALL.
JOSEPH GOULDBOURN.
ARTHUR E. JERRAM.

Witnesses:
MARGARETTIE MAY POYNOR,
KATHERINE PENTON.